United States Patent
Kim et al.

(10) Patent No.: US 7,542,518 B2
(45) Date of Patent: Jun. 2, 2009

(54) PREDISTORTION APPARATUS AND METHOD FOR COMPENSATING FOR A NONLINEAR DISTORTION CHARACTERISTIC OF A POWER AMPLIFIER USING A LOOK-UP TABLE

(75) Inventors: Dong-Hyun Kim, Suwon-si (KR); Dong-Won Shin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 705 days.

(21) Appl. No.: 11/027,676

(22) Filed: Jan. 3, 2005

(65) Prior Publication Data

US 2005/0180526 A1 Aug. 18, 2005

(30) Foreign Application Priority Data

Jan. 2, 2004 (KR) .................... 10-2004-0000148

(51) Int. Cl.
*H04K 1/02* (2006.01)
(52) U.S. Cl. .................... 375/297; 455/114.3
(58) Field of Classification Search ........... 375/297, 375/296, 263, 373, 376, 268, 261, 285; 330/149, 330/110, 85, 253; 455/114.3, 114.2, 127.3
See application file for complete search history.

(56) References Cited

U.S. PATENT DOCUMENTS

| 5,867,065 A | * | 2/1999 | Leyendecker | 330/149 |
| 6,236,837 B1 | * | 5/2001 | Midya | 455/63.1 |
| 2004/0052313 A1 | * | 3/2004 | Hovakimyan | 375/296 |
| 2004/0198268 A1 | * | 10/2004 | Rashev et al. | 455/126 |

* cited by examiner

*Primary Examiner*—David C Payne
*Assistant Examiner*—Rahel Guarino
(74) *Attorney, Agent, or Firm*—Roylance, Abrams, Berdo & Goodman, LLP

(57) ABSTRACT

A polynomial predistortion apparatus and method for compensating for a nonlinear distortion characteristic of a power amplifier is provided. The apparatus and method comprise an adaptation controller for determining polynomial coefficients by calculating an inverse nonlinear distortion characteristic of the power amplifier, and calculating complex predistortion gains for all possible amplitudes of an input signal using the determined polynomial coefficients; and a predistorter for receiving an input signal which is a combination of complex-modulated previous baseband input signal samples and current input signal samples, predistorting the input signal using the complex predistortion gains output from the adaptation controller, and outputting the predistorted input signal to the power amplifier.

14 Claims, 3 Drawing Sheets

PREDISTORTION APPARATUS AND METHOD FOR COMPENSATING FOR A NONLINEAR DISTORTION CHARACTERISTIC OF A POWER AMPLIFIER USING A LOOK-UP TABLE

PRIORITY

This application claims the benefit under 35 U.S.C. § 119 (a) to an application entitled "Predistortion Apparatus and Method for Compensating for Nonlinear Distortion Characteristic of Power Amplifier Using Look-up Table" filed in the Korean Intellectual Property Office on Jan. 2, 2004 and assigned Ser. No. 2004-148, the entire contents of which are incorporated herein by reference.

BACKGROUND OF THE INVENTION

1. Field of the Invention

The present invention relates generally to a wideband power amplification apparatus and method. In particular, the present invention relates to a baseband signal predistortion apparatus and method for linearizing a nonlinear distortion characteristic caused by a power amplifier.

2. Description of the Related Art

In a conventional mobile communication system that performs communication using radio frequency (RF) signals, an RF amplifier is divided into a low-power, low-noise amplifier and a high-power transmission amplifier. In the high-power transmission amplifier, the efficiency of the high-power transmission amplifier rather than the noise it produces is an important factor that should be taken into consideration. Accordingly, a high-power amplifier (HPA) commonly used in the mobile communication system operates close to a non-linear operation point so that it can obtain high efficiency.

To accomplish this, an output of the amplifier generates an inter-modulation distortion (IMD) component, and the inter-modulation distortion component affects not only an in-band signal but also an out-band signal as a spurious signal. In order to remove the spurious component, a feed-forward scheme is primarily used. The feed-forward scheme can almost completely remove the spurious component, but it reduces amplification efficiency and requires a control operation in an RF stage, inevitably causing an increase in size and price of the system.

Research is being performed for a digital predistortion (DPD) scheme having high efficiency and low cost. The digital predistortion scheme inverts the nonlinearity of a power amplifier at a digital stage to predistort an input signal, thereby linearizing an output signal of the power amplifier. The nonlinearity can be classified into an amplitude modulation-to-amplitude modulation (AM/AM) characteristic in which the amplitude of an output signal depends upon the amplitude of an input signal, and an amplitude modulation-to-phase modulation (AM/PM) characteristic in which a phase of an output signal depends upon the amplitude of an input signal.

A predistortion scheme using a complex polynomial as a typical predistortion scheme is used for compensating for the nonlinearity of a power amplifier. A complex polynomial-type predistorter (hereinafter referred to as a "polynomial predistorter") uses a polynomial to calculate an inverse non-linear distortion characteristic of the power amplifier, contributing to a reduction in time required for removing the nonlinearity of the power amplifier. That is, the polynomial predistorter has a high convergence speed. When a memory effect is not taken into consideration, a $P^{th}$-order predistortion polynomial is expressed as $$d(n)=x(n)\{a_0+a_1|x(n)|+a_2|x(n)|^2+\ldots+a_{(P-1)}|x(n)|^{(P-1)}\} \quad (1)$$

In Equation (1), d(n) denotes a predistorted signal, and a value within { } multiplied by an input signal x(n) can be regarded as a predistortion gain.

For most predistorters, research has been performed on a single tone or a narrowband frequency signal. Therefore, most proposed predistortion schemes simply compensate for only memoryless nonlinearity (in which only a current input affects a current output) of a power amplifier. However, for memory nonlinearity of a nonlinear amplifier at a wideband frequency, not only a current input signal but also previous input signals affect a current output of the nonlinear amplifier, causing a definite change in an AM/AM characteristic and an AM/PM characteristic. Such a phenomenon is called the "memory effect," wherein the nonlinearity of a power amplifier appears differently according to a frequency bandwidth of an input signal. With the recent increasing tendency to use a frequency band in a mobile communication system, active research is being conducted on a predistortion scheme that takes the memory effect of a nonlinear amplifier into consideration. A discrete Volterra series scheme compensates for the memory effect using a polynomial that takes previous input samples into account.

The nonlinearity removal capability of the polynomial predistorter depends upon the number of previous input samples to be taken into consideration and an order of the polynomial. Each increase in number of previous input samples to be taken into consideration causes an exponential increase in calculations. Therefore, the polynomial predistorter, although it has a high convergence speed, is very complicated in terms of a numerical formula and has many calculations. As a result, the polynomial predistorter is difficult to implement and requires a large number of fast multipliers, causing an increase in the size of a logic circuit.

There is a predistortion scheme using a look-up table (LUT) capable of solving the foregoing problem. Because the look-up table stores predistortion gains for a possible amplitude range of input signals, the look-up table-based scheme generally requires very small calculations. However, in order to correctly remove the nonlinearity of a power amplifier having the memory effect, it is necessary to apply an adaptive algorithm to each of entries, i.e., predistortion gains, stored in the look-up table, causing an increase in time required for linearizing the power amplifier, or causing a decrease in convergence speed.

As a method for linearizing a power amplifier using a predistorter to compensate for the foregoing disadvantages, there has been proposed a predistortion scheme having advantages of both the polynomial-based predistortion scheme having a high convergence speed and the look-up table-based predistortion scheme having small calculations. The proposed predistortion scheme extracts parameters of a predistorter using the polynomial predistortion scheme and converts the extracted parameters of the predistorter into a look-up table form. In this manner, the predistorter using a polynomial can have a high convergence speed which is the advantage of the polynomial predistorter and small calculations which is the advantage of the look-up table predistorter.

The proposed predistortion scheme, when parameters of a predistorter are converted into a look-up table format, multiplies the parameters by input signals according to the amplitude of the input signals by referencing particular look-up table values. Several clocks are required for determining a look-up table address according to the amplitude of an input signal, and several clocks are also required for reading data from the look-up table. For a Field Programmable Gate Array (FPGA) structure satisfying predistortion polynomial, a processor using a clock whose rate is about 10 times higher than an input sample rate of a predistorter is required. Because the maximum operating clock rate of the current FPGA is about 200 MHz, in the existing Infinite Impulse Response (IIR) structure, a predistorted input signal unavoidably has a sample rate of about 20 MHz or lower, and this sample rate is not suitable for an amplifier of a wideband base station.

SUMMARY OF THE INVENTION

It is, therefore, an object of the present invention to provide a predistortion apparatus and method for compensating for a nonlinear distortion characteristic of a power amplifier having a memory effect using a look-up table.

It is another object of the present invention to provide a predistortion apparatus and method for calculating entries of a look-up table using predistortion parameters extracted through a predistortion polynomial.

It is further another object of the present invention to provide a predistortion apparatus and method for solving the above-described sample rate problem using a Finite Impulse Response (FIR) structure that forms a current output signal of a predistorter taking a previous input signal of the predistorter into consideration.

To achieve the above and other objects, there is provided a polynomial predistortion apparatus for compensating for a nonlinear distortion characteristic of a power amplifier. The apparatus comprises an adaptation controller for determining polynomial coefficients by calculating an inverse nonlinear distortion characteristic of the power amplifier, and calculating complex predistortion gains for all possible amplitudes of an input signal using the determined polynomial coefficients; and a predistorter for receiving an input signal which is a combination of complex-modulated previous baseband input signal samples and current input signal samples, predistorting the input signal using the complex predistortion gains output from the adaptation controller, and outputting the predistorted input signal to the power amplifier.

To achieve the above and other objects, there is provided a polynomial predistortion apparatus and method for compensating for a nonlinear distortion characteristic of a power amplifier. The apparatus and method comprise determining polynomial coefficients using an inverse nonlinear distortion characteristic of the power amplifier; calculating predistortion gains for all possible amplitudes of an input signal using the determined polynomial coefficients; updating a look-up table in which complex predistortion gains addressed with amplitudes of the input signal are stored; upon receiving a complex-modulated baseband input signal, accessing complex predistortion gains corresponding to amplitudes of the input signal from the look-up table; and predistorting the input signal using the complex predistortion gains, and outputting the predistorted signal to the power amplifier.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

An embodiment of the present invention will now be described in detail with reference to the accompanying drawings. In the following description, a detailed description of known functions and configurations incorporated herein has been omitted for conciseness.

The embodiment of the present invention is characterized by calculating predistortion parameters for linearization of a power amplifier using a predistortion polynomial, and converting the calculated predistortion parameters into a look-up table (LUT) form. Herein, the predistortion parameters refer to complex polynomial coefficients.

Figure 1:
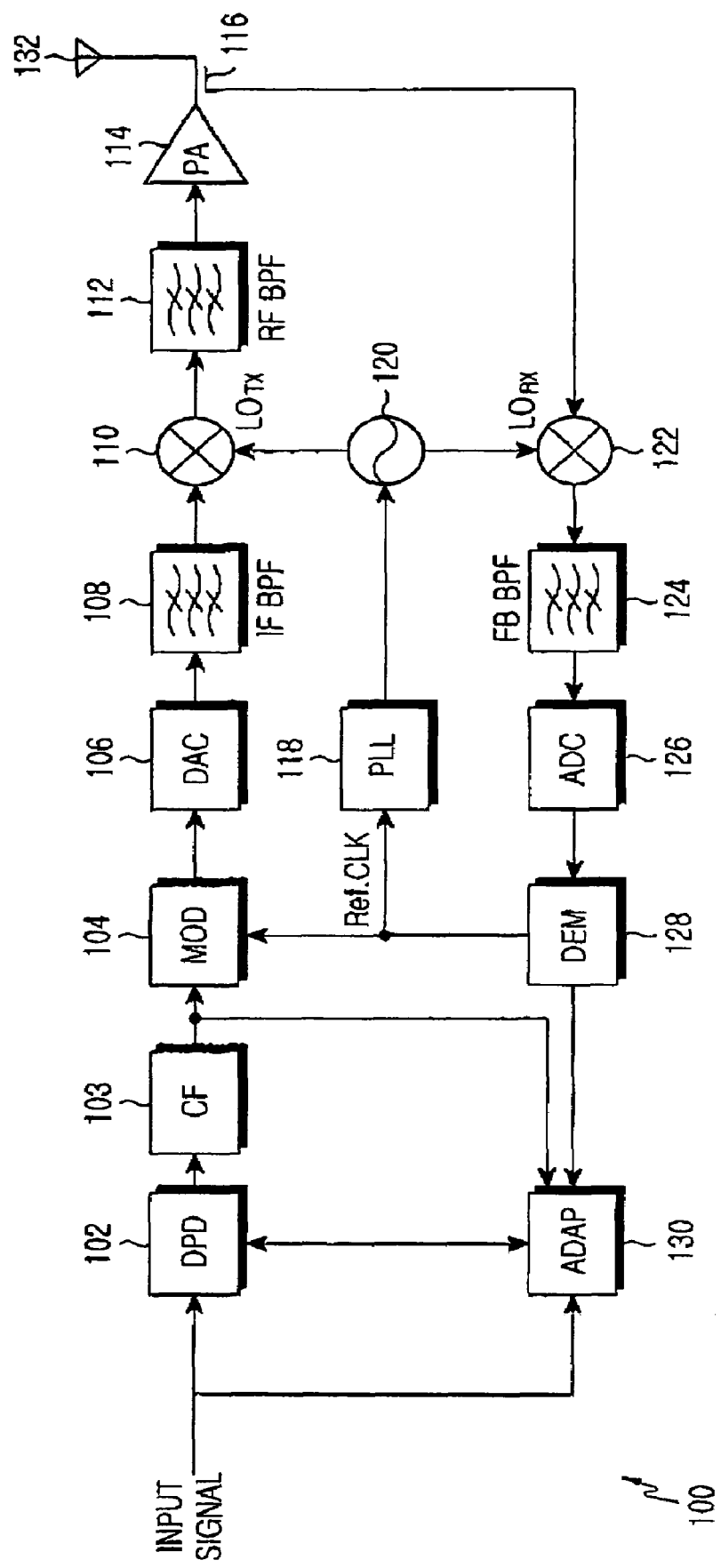
FIG. 1 is a block diagram illustrating a transmitter for outputting an amplified signal linearized using a predistorter having a look-up table according to an embodiment of the present invention.

FIG. 1 is a block diagram illustrating a transmitter for outputting an amplified signal linearized using a predistorter having a look-up table according to an embodiment of the present invention. Such a transmitter is used, for example, in a mobile communication system that performs radio communication using radio frequency (RF) signals.

Referring to FIG. 1, a transmitter 100 is divided into a forward path and a feedback path. The forward path includes a digital predistorter (DPD) 102, a correction filter (CF) 103, a digital modulator (MOD) 104, a digital-to-analog converter (DAC) 106, an intermediate frequency (IF) band-pass filter (BPF) 108, a frequency up-converter 110, a radio frequency (RF) BPF 112, a power amplifier (PA) 114, and a transmission antenna 132. The feedback path includes a directional coupler (DC) 116 interposed between the power amplifier 114 and the transmission antenna 132, a frequency down-converter 122, a feedback (FB) BPF 124, an analog-to-digital converter (ADC) 126, a digital demodulator (DEM) 128, and an adaptation controller (ADAP) 130.

A digital input signal comprising an in-phase (I) signal component and a quadrature-phase (Q) signal component is input to the digital predistorter 102. The digital predistorter 102 converts the in-phase and quadrature-phase input signals in order to pre-compensate for distortions possibly occurring in the power amplifier 114. The digital predistorter 102 calculates predistortion gains using polynomial coefficients obtained by modeling an inverse nonlinear distortion characteristic of the power amplifier 114, and stores the calculated predistortion gains in its look-up table.

An output of the digital predistorter 102 is applied to the correction filter 103. The correction filter 203 has an inverse frequency response of an amplitude characteristic and a group delay characteristic occurring in the forward path with the exclusion of the power amplifier 114. Therefore, the correction filter 103 can compensate for signal distortion occurring in the forward path with the exclusion of the power amplifier 114.

Figure 3:
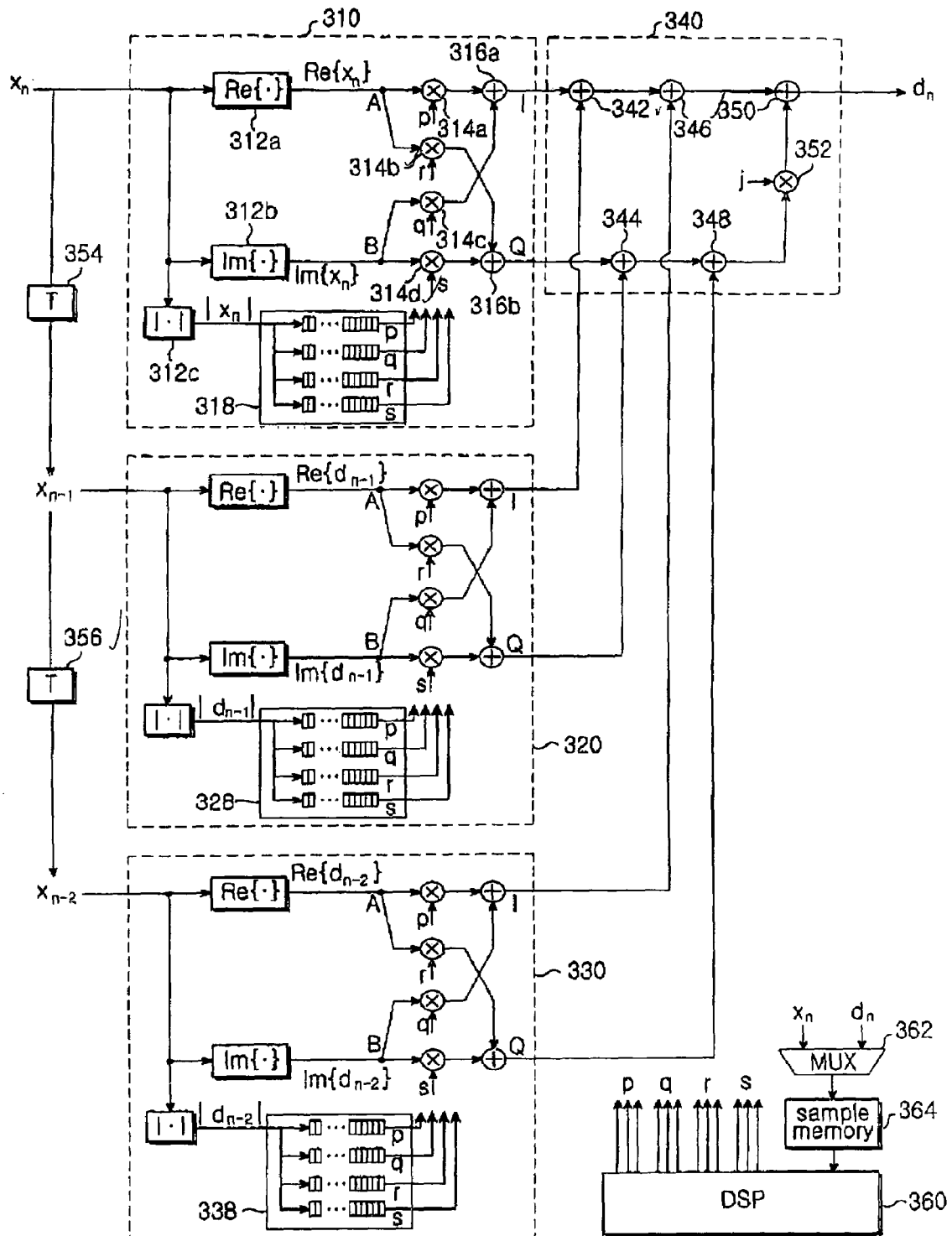
FIG. 3 is a diagram illustrating a structure of a digital predistorter for receiving an input signal x(n) and outputting a predistorted signal d(n) according to an embodiment of the present invention.

An output of the correction filter 103 is applied to the digital modulator 104, and the digital modulator 104 modulates the in-phase and quadrature-phase input signals into a single digital signal using quadrature modulation. The digital signal output from the digital modulator 104 is converted into an analog IF signal by the digital-to-analog converter 106. As illustrated in FIG. 3, a distortion component output from the digital-to-analog converter 106 is cancelled by the signal corrected by the correction filter 103.

The IF BPF 108 BPF-filters the analog IF signal output from the digital-to-analog converter 106. The IF signal BPF-filtered by the IF BPF 108 is converted into a RF signal having a frequency band of the mobile communication system by the frequency up-converter 110. Specifically, the frequency up-converter 110 is implemented with a mixer for generating a desired frequency by mixing the BPF-filtered IF signal with a transmission local oscillation signal $LO_{TX}$ generated by an oscillator 120 using a reference clock Ref.CLK from a phase locked loop (PLL) 118. The reference clock Ref.CLK is also used for a modulation operation in the digital modulator 104.

The RF BPF 112 BPF-filters the RF signal output from the frequency up-converter 110. The power amplifier 114 amplifies the BPF-filtered RF signal output from the RF BPF 112, and transmits the amplified RF signal through the transmission antenna 132.

The feedback path for a predistortion operation of the digital predistorter 102 monitors the amplified signal output from the power amplifier 114. To this end, the directional coupler 116 delivers a part of the signal, being transmitted from the power amplifier 114 to the transmission antenna 132, to the frequency down-converter 122. The frequency down-converter 122 performs an inverse operation of the frequency up-converter 110. That is, the frequency down-converter 122 down-converts the RF signal amplified by the power amplifier 114 into an IF signal. Specifically, the frequency down-converter 122 is implemented with a mixer for generating a desired frequency by mixing the amplified RF signal with a reception local oscillation signal $LO_{RX}$ generated by the oscillator 120. The feedback BPF 124 BPF-filters the IF signal output from the frequency down-converter 122.

An analog IF signal BPF-filtered by the feedback BPF 124 is converted into a digital signal by the analog-to-digital converter 126. The digital demodulator 128 demodulates the digital signal into an in-phase signal and a quadrature-phase signal in synchronism with the reference clock Ref. CLK in an inverse manner of the digital modulator 104, and outputs the in-phase signal and the quadrature-phase signal to the adaptation controller 230.

Also, the adaptation controller 130 periodically monitors an output signal of the digital predistorter 102. Thus, the adaptation controller 130 receives the output signal (a signal desired to be transmitted) of the digital predistorter 102 and the output signal (a signal being actually transmitted) of the digital modulator 128, determines coefficients for calculation of a predistortion polynomial using the received signals, and calculates predistortion gains for all possible amplitudes of input signals using the determined polynomial coefficients. The calculated predistortion gains are stored in the look-up table in the digital predistorter 102.

Although the embodiment of the present invention will be described herein with reference to a polynomial predistortion method that determines predistortion polynomial coefficients considering a current input signal and a predistorted previous input signal and predistorts an input signal using complex vector multiplication, the embodiment of the present invention is characterized by storing predistortion gains calculated by the polynomial predistortion method in a look-up table and is not limited to the polynomial predistortion method.

According to the polynomial predistortion method, predistortion of an input signal is expressed as $$d(n)=x(n)\{a_0+a_1|x(n)|+a_2|x(n)|^2+\ldots+a_P|x(n)|^P\} \quad (2)$$

In Equation (2), a value in { } multiplied by a complex signal $x(n)$ ($=x_i(n)+i*x_q(n)$) can be regarded as a gain polynomial of the complex signal $x(n)$, and the gain polynomial can be converted into a look-up table form by calculating the gain polynomial for each amplitude of $|x(n)|$ and storing the result in a look-up table.

A description will now be made of the digital predistorter of FIG. 1 in which the number of previous samples that should be taken into consideration is 2. The digital predistorter receives an in-phase signal and a quadrature-phase signal as its input signal. The input signal is multiplied by corresponding vector gains $p_0$, $q_0$, $r_0$ and $s_0$ for a current sample. A time-delayed input signal to the digital predistorter is multiplied by vector gains $p_1$, $q_1$, $r_1$, and $s_1$ (where i=1 and 2) for a previous input signal. An output of the digital predistorter is obtained by summing the multiplication results. The vector gains multiplied by each signal sample are given as look-up table values of an address calculated according to the amplitude of the corresponding signal sample. The look-up table values are calculated from polynomial parameters, and the polynomial parameters are updated in a digital signal processor by an adaptive algorithm.

The predistortion gains are obtained by calculating a predistortion polynomial using complex polynomial coefficients. For an input signal $x(n)$, a predistorted signal $d(n)$ is given as $$d(n)=d_i(n)+jd_q(n)=x_d(n)(p_i(n)+jp_q(n)) \quad (3)$$

where $x_d(n)$ is calculated by $$x_d(n) = [x_i(n)x_q(n)\, x_i(n)|x(n)||x_q(n)|\, x(n)| \ldots x_i(n)|x(n)|^P x_q(n)|\, x(n)|^P \quad (4)$$
$$x_i(n-1)x_q(n-1)x_i(n-1)|x(n-1)||x_q(n-1)|\, x(n-1)| \ldots$$
$$x_i(n-1)|\, x(n-1)|^P x_q(n-1)|x(n-1)|^P \ldots x_i(n-M)x_q(n-M)$$
$$x_i(n-M)|\, x(n-M)||x_q(n-M)||x(n-M)| \ldots x_i(n-M)$$
$$|x(n-M)|^P x_q(n-M)|^P\, x_q(n-M)|x(n-M)|^P\,]$$
$$p_i(n) = [p_{ii,0,0}\, p_{iq,0,0}\, p_{ii,0,1}\, p_{iq,0,1}\, \ldots\, p_{ii,0,P}\, p_{iq,0,P}\, p_{ii,1,0}\, p_{iq,1,0}$$
$$p_{ii,1,1}\, p_{iq,1,1}\, \ldots\, p_{ii,1,P}\, p_{iq,1,P}\, \ldots\, p_{ii,M,0}\, p_{iq,M,0}$$
$$p_{ii,M,1}\, p_{iq,M,1}\, \ldots\, p_{ii,M,P}\, p_{iq,M,P}]^T$$
$$p_q(n) = [p_{qi,0,0}\, p_{qq,0,0}\, p_{qi,0,1}\, p_{qq,0,1}\, \ldots\, p_{qi,0,P}\, p_{qq,0,P}\, p_{qi,1,0}\, p_{qq,1,0}$$
$$p_{qi,1,1}\, p_{qq,1,1}\, \ldots p_{qi,1,P}\, p_{qq,1,P}\, \ldots\, p_{qi,M,0}\, p_{qq,M,0}$$
$$p_{qi,M,1}\, p_{qq,M,1}\, \ldots\, p_{qi,M,P}\, p_{qq,M,P}]^T$$

where M denotes the number of previous samples, and P denotes an order of a polynomial.

An in-phase gain part multiplied by each input signal sample can be separately expressed as $$d_i(n) = x_i(n)[1|x(n)||x(n)|^2 \ldots |x(n)|^P] \cdot [p_{ii,0,0}\, p_{ii,0,1}\, \ldots\, p_{ii,0,P}]^T + \quad (5)$$
$$x_q(n)[1|x(n)||x(n)|^2 \ldots |x(n)|^P] \cdot [p_{iq,0,0}\, p_{iq,0,1}\, \ldots\, p_{iq,0,P}]^T +$$
$$x_i(n-1)[1|x(n-1)||x(n-1)|^2 \ldots |x(n-1)|^P] \cdot [p_{ii,1,0}\, p_{ii,1,1}\, \ldots$$
$$p_{ii,1,P}]^T + x_q(n-1)[1|x(n-1)||x(n-1)|^2 \ldots$$
$$|x(n-1)|^P] \cdot [p_{iq,1,0}\, p_{iq,1,1}\, \ldots\, p_{iq,1,P}]^T + \ldots$$
$$x_i(n-M)[1|x(n-M)||x(n-M)|^2 \ldots |x(n-M)|^P] \cdot$$
$$[p_{ii,M,0}\, p_{ii,M,1}\, \ldots\, p_{ii,M,P}]^T + x_q(n-M)[1|x(n-M)|$$
$$|x(n-M)|^2 \ldots |x(n-M)|^P] \cdot [p_{iq,M,0}\, p_{iq,M,1}\, \ldots\, p_{iq,M,P}]^T$$

A predistortion gain for $x_i(n)$ is defined as $$[1\,|x(n)|\,|x(n)|^2\ldots|x(n)|^P]\cdot[p_{ii,0,0}p_{ii,0,1}\ldots p_{ii,0,P}]^T$$

or

Gain for $x_i(n) = p_{ii,0,0} + p_{ii,0,1}|x(n)| + \ldots + p_{ii,0,P}|x(n)|^P$ (6)

The predistortion gains become values of the look-up table addressed by amplitude $|x(n)|$ of $x(n)$. The look-up table values are calculated by determining the maximum amplitude of an input signal and dividing the maximum amplitude by the number of look-up tables to calculate gains at the corresponding amplitude. Therefore, a predistortion gain for $x_i(n)$ is calculated by $$LUT \text{ value for } x_i(n)|_{|x(n')=\Delta x} = p_{ii,0,0} + p_{ii,0,1}|k\Delta x| + \ldots + p_{ii,0,P}|k\Delta x|^P \quad (7)$$

where $k=0, 1, 2, \ldots, N_{LUT}-1$, and $\Delta x$ is defined as $$\Delta x = \frac{\max[|x(n)|]}{N_{LUT}}$$

when the look-up table is addressed by equally dividing amplitude of an input signal. $\Delta x$ has a specific non-uniformly determined step amplitude when an amplitude of an input signal is not equally divided.

Figure 2:
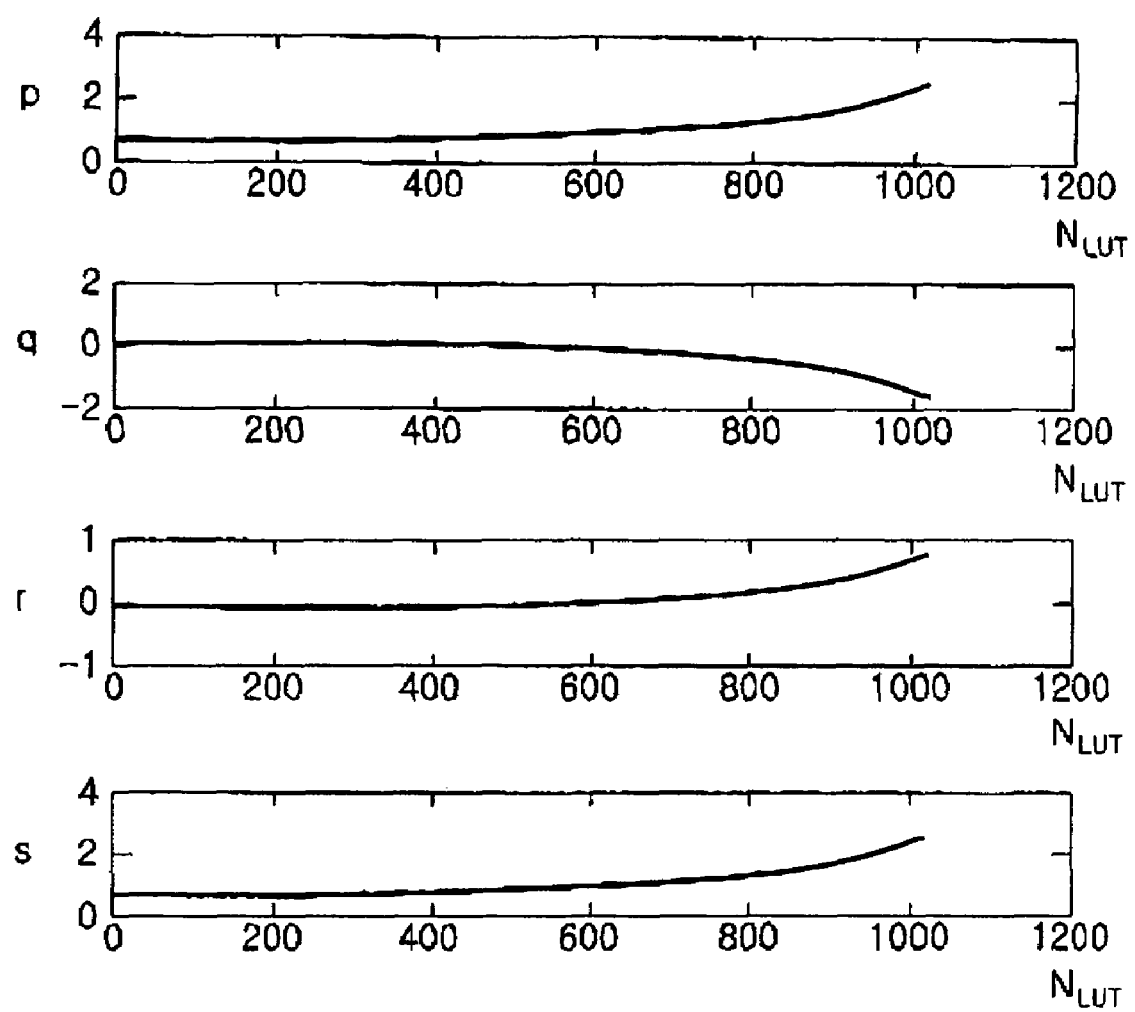
FIG. 2 is a diagram illustrating predistortion gains stored in a look-up table of the digital predistorter.

Equation (6) and Equation (7) are equally applied even to other signal samples $x_i(n)$, $x_q(n)$, $x_i(n-1)$, $x_q(n-1)$, $\ldots$, $x_i(n-M)$, $x_q(n-M)$. Predistortion gains for $x_i(n)$, stored in the look-up table, are illustrated in FIG. 2 by way of example. In FIG. 2, an x-axis denotes the number of entries of a look-up table and a y-axis denotes a predistortion gain.

FIG. 3 is a diagram illustrating a structure of the digital predistorter 102 for receiving an input signal $x(n)$ and outputting a predistorted signal $d(n)$ according to an embodiment of the present invention. The new predistorter is provided to solve the problem of the existing predistorter that uses two previous predistorted signal samples.

Referring to FIG. 3, a first complex multiplier 310 multiplies an in-phase signal component and a quadrature-phase signal component of a current input signal $x(n)$ (denoted by "$x_n$") by their corresponding predistortion gains, and an output of the first complex multiplier 310 is combined with outputs of second and third complex multipliers 320 and 330, generating a predistorted signal $d(n)$ (denoted by "$d_n$"). The second complex multiplier 320 multiplies an in-phase signal component and a quadrature-phase signal component of a signal $x(n-1)$ (denoted by "$x_{n-1}$") obtained by delaying the input signal $x(n)$ through a delay 354 by 1 sample, by their corresponding predistortion gains, and the third complex multiplier 330 multiplies an in-phase signal component and a quadrature-phase signal component of a signal $x(n-2)$ (denoted by "$x_{n-2}$") obtained by delaying the input signal $x(n)$ through delays 354 and 356 by 2 samples, by their corresponding predistortion gains.

More specifically, the first complex multiplier 310 extracts an in-phase signal component $x_i(n)$ from the input signal $x(n)$ by a real-component extractor 312a, and extracts a quadrature-phase signal component $x_q(n)$ from the input signal $x(n)$ by an imaginary-component extractor 312b. The extracted signal components are provided to multipliers 314a, 314b, 314c and 314d.

Further, the first complex multiplier 310 calculates an amplitude $|x(n)|$ of the input signal $x(n)$ by an absolute value calculator 312c, and provides the calculated value to a look-up table 318 as an address. In response, the look-up table 318 outputs in-phase predistortion gains p and q and quadrature-phase predistortion gains r and s corresponding to the amplitude $|x(n)|$ of the input signal $x(n)$.

The predistortion gains p and r are multiplied by the in-phase signal component $x_i(n)$ by the multipliers 314a and 314b, and the predistortion gains q and s are multiplied by the quadrature-phase signal component $x_q(n)$ by the multipliers 314c and 314d, respectively. That is, the predistortion gains p and r are in-phase and quadrature-phase predistortion gains for the in-phase signal component of the input signal $x(n)$, respectively, and the predistortion gains q and s are in-phase and quadrature-phase predistortion gains for the quadrature-phase signal component of the input signal $x(n)$, respectively. Finally, an adder 316a adds up outputs of the multipliers 314a and 314c, and outputs the result as an in-phase signal component, and an adder 316b adds up outputs of the multipliers 314b and 314d, and outputs the result as a quadrature-phase signal component.

In the same manner, the second and third complex multipliers 320 and 330 read predistortion gains corresponding to amplitudes $|x(n-1)|$ and $|x(n-2)|$ of their input signals $x(n-1)$ and $x(n-2)$ from their look-up tables 328 and 338, and multiply in-phase signal components and quadrature-phase signal components of their input signals $x(n-1)$ and $x(n-2)$ by the read predistortion gains.

A summer 340 sums up in-phase and quadrature-phase outputs of the first to third complex multipliers 310 to 330 by in-phase adder 342 and 346 and quadrature-phase adders 344 and 348. The summed quadrature-phase signal component is classified as an imaginary component by a multiplier 352, and the imaginary component is added to the summed in-phase signal component by an adder 350, generating the predistorted signal $d(n)$.

Also, FIG. 3 illustrates a digital signal processor 360 for updating the look-up tables 318, 328 and 338. The digital signal processor 360 is included in the adaptation controller 130 of FIG. 1. The digital signal processor 360 determines polynomial coefficients using current and previous samples provided from a sample memory 364, and calculates predistortion gains to be stored in the look-up tables 318, 328 and 338. To this end, the sample memory 364 stores therein a current sample $x(n)$ and previous samples $x(n-M)$ received from a multiplexer 362, and provides the samples to the digital signal processor 360. A size of the sample memory 364 is determined such that a predetermined number of samples can be stored in the sample memory 364.

The proposed transmitter illustrated in FIG. 1 receives a predetermined number of, for example, hundreds of complex-modulated signal samples, calculates predistortion gains determined by correctly calculating an inverse nonlinear distortion characteristic of a power amplifier by an adaptive algorithm, and stores the calculated predistortion gains in a look-up table in the predistorter. Thereafter, the transmitter predistorts a complex-modulated signal to be actually transmitted, using the look-up table, and amplifies the predistorted signal by the power amplifier. The transmitter can calculate the predistortion gains and update the look-up tables at stated periods or upon receipt of an instruction from an operator.

As can be understood from the foregoing description, at an FPGA operating clock rate which is equal to a sample rate of a predistorted input signal used for linearization of a power amplifier, the proposed predistorter can process a signal having a larger bandwidth as compared with the conventional predistorter, and has advantages of both the polynomial-based predistorter having a high convergence speed and the look-up table-based predistorter having small calculations.

While the invention has been shown and described with reference to a certain embodiment thereof, it should be understood by those skilled in the art that various changes in form and details may be made therein without departing from the spirit and scope of the invention as defined by the appended claims.

What is claimed is:

1. A polynomial predistortion apparatus for compensating for a nonlinear distortion characteristic of a power amplifier, comprising;
   an adaptation controller for determining polynomial coefficients by calculating an inverse nonlinear distortion characteristic of the power amplifier, and calculating complex predistortion gains for all possible amplitudes of an input signal using the determined polynomial coefficients; and
   a predistorter for receiving an input signal which is a combination of complex-modulated previous baseband input signal samples and current input signal samples, predistorting the input signal using the complex predistortion gains output from the adaptation controller, and outputting the predistorted input signal to the power amplifier,
   wherein the predistorter comprises:
       a first complex multiplier for multiplying an in-phase signal component and a quadrature-phase signal component of a current input signal by complex predistortion gains which ate accessed from the look-up table according to amplitudes of the current input signal;
       at least one second complex multiplier for multiplying an in-phase signal component and a quadrature-phase signal component of a previous input signal by complex predistortion gains which are accessed from the look-up table according to amplitudes of the previous input signal; and
       a summer for summing outputs of the first and second complex multipliers to generate a predistorted signal, and outputting the predistorted signal to the power amplifier.

2. The polynomial predistortion apparatus of claim 1, wherein the predistorter accesses complex predistortion gains corresponding to amplitude of an input signal from a look-up table in which complex predistortion gains addressed with amplitudes of the input signal are stored.

3. The polynomial predistortion apparatus of claim 1, wherein the adaptation controller updates the look-up table by calculating the predistortion gains periodically or at a time indicated by a user.

4. The polynomial predistortion apparatus of claim 1, further comprising a correction filter for compensating for distortion occurring in a transmission path excluding the power amplifier arranged in the rear of the predistorter.

5. A polynomial predistortion method for compensating for a nonlinear distortion characteristic of a power amplifier, comprising the steps of:
   determining polynomial coefficients using an inverse nonlinear distortion characteristic of the power amplifier;
   calculating predistortion gains for all possible amplitudes of an input signal using the determined polynomial coefficients;
   updating a look-up table in which complex predistortion gains addressed with amplitudes of the input signal are stored;
   upon receiving an complex-modulated baseband input signal, accessing complex predistortion gains corresponding to amplitudes of the input signal from the look-up table; and
   predistorting the input signal, which is a combination of acurrent input signal sample and a previous input signal sample, using the complex predistortion gains, and outputting the predistorted signal to the power amplifier,
   wherein the step of predistorting comprises the steps of:
       multiplying an in-phase signal component and a quadrature-phase signal component of a current input signal by complex predistortion gains which are accessed from the look-up table according to amplitudes of the current input signal;
       multiplying an in-phase signal component and a quadrature-phase signal component of a previous input signal by complex predistortion gains which are accessed from the look-up table according to amplitudes of the previous input signal; and
       summing outputs of the first and second complex multipliers to generate a predistorted signal, and outputting the predistorted signal to the power amplifier.

6. A polynomial predistortion apparatus for compensating for a nonlinear distortion characteristic of a power amplifier, comprising;
   means for determining polynomial coefficients by calculating an inverse nonlinear distortion characteristic of the power amplifier, and calculating complex predistortion gains for all possible amplitudes of an input signal using the determined polynomial coefficients; and
   means for receiving an input signal which is a combination of complex-modulated previous baseband input signal samples and current input signal samples, predistorting the input signal using the complex predistortion gains output from the adaptation controller, and outputting the predistorted input signal to the power amplifier,
   wherein the means for receiving an input signal comprises:
       a means for multiplying an in-phase signal component and a quadrature-phase signal component of a current input signal by complex predistortion gains which are accessed from the look-up table according to amplitudes of the current input signal;
       a means for multiplying an in-phase signal component and a quadrature-phase signal component of a previous input signal by complex predistortion gains which are accessed from the look-up table according to amplitudes of the previous input signal; and
       a means for summing outputs of the means for multiplying an in-phase signal component and a quadratue-phase signal component of a current input signal and the means for multiplying an in-phase signal component and a quadrature-phase signal component of a previous input signal to generate a predistorted signal, and outputting the predistorted signal to the power amplifier.

7. The polynomial predistortion apparatus of claim 6, wherein the means for receiving an input signal further accesses complex predistortion gains corresponding to amplitude of an input signal from a look-up table in which complex predistortion gains addressed with amplitudes of the input signal are stored.

8. The polynomial predistortion apparatus of claim 6, wherein the means for determining polynomial coefficients further updates the look-up table by calculating the predistortion gains periodically or at a time indicated by a user.

9. The polynomial predistortion apparatus of claim 6, further comprising a means for compensating for distortion occurring in a transmission path excluding the power amplifier arranged in the rear of the means for receiving an input signal.

10. The polynomial predistortion apparatus of claim 6, wherein the means for receiving an input signal comprises a predistorter.

11. The polynomial predistortion apparatus of claim 6, wherein the means for determining polynomial coefficients comprises an adaptation controller.

12. The polynomial predistortion apparatus of claim 6, wherein the means for multiplying an in-phase signal component and a quadrature-phase signal component of a current input signal comprises a first complex multiplier.

13. The polynomial predistortion apparatus of claim 6, wherein the means for multiplying an in-phase signal component and a quadrature-phase signal component of a previous input signal comprises an at least one second complex multiplier.

14. The polynomial predistortion apparatus of claim 6, wherein the means for summing outputs of the means for multiplying an in-phase signal component and a quadrature-phase signal component of a current input signal and the means for multiplying an in-phase signal component and a quadrature-phase signal component of a previous input signal comprises a summer.

* * * * *